March 10, 1970 Z. POKORNY 3,500,026
MULTIPLICATION APPARATUS UTILIZING EITHER A POSITIVE OR A NEGATIVE MULTIPLIER WHEREIN FORM CONVERSION AT EACH INTERFACE OF THE MULTIPLYING UNIT IS UNNECESSARY
Filed Sept. 7, 1966 2 Sheets-Sheet 1
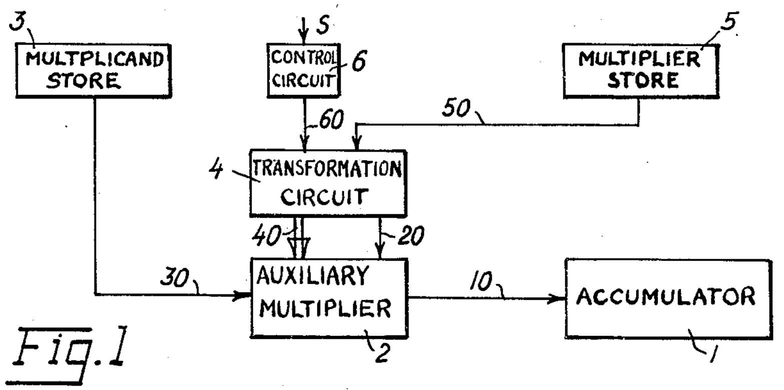
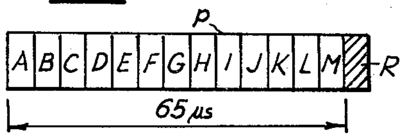
FIG. 3A
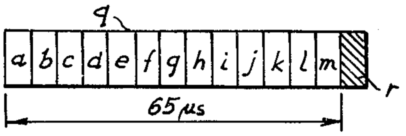
FIG. 3B
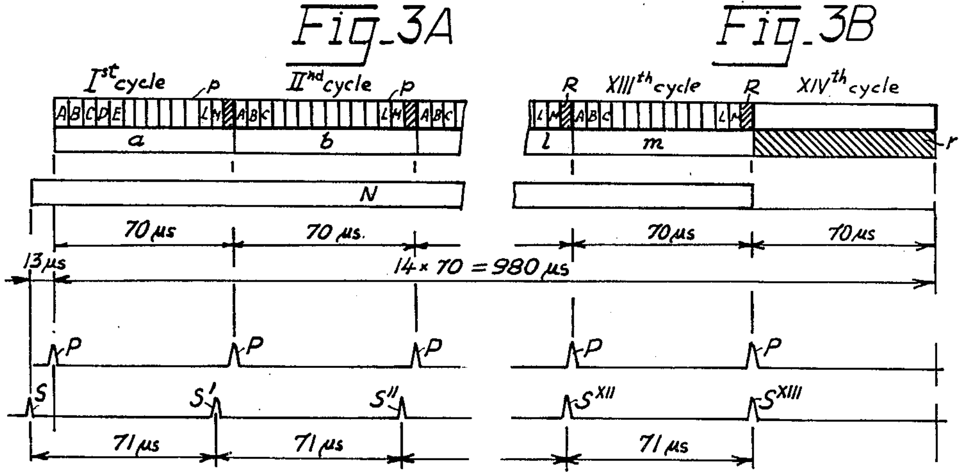
FIG. 4
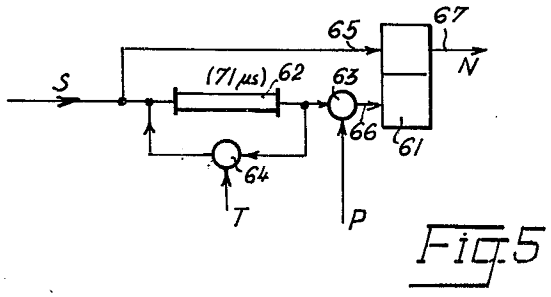
INVENTOR:
Zdeněk POKORNÝ
BY Arthur O. Klein
his Attorney INVENTOR:
Zdeněk POKORNY
BY Arthur O. Klein
his Attorney United States Patent Office 3,500,026

Patented Mar. 10, 1970

3,500,026

MULTIPLICATION APPARATUS UTILIZING EITHER A POSITIVE OR A NEGATIVE MULTIPLIER WHEREIN FORM CONVERSION AT EACH INTERFACE OF THE MULTIPLYING UNIT IS UNNECESSARY

Zdeněk Pokorný, Prague, Czechoslovakia, assignor to Vyzkumny ustav Matematickych Stroju, Prague, Czechoslovakia, a corporation Filed Sept. 7, 1966, Ser. No. 577,641
Claims priority, application Czechoslovakia, Sept. 10, 1965, 5,582/65
Int. Cl. G06f 7/38
U.S. Cl. 235—160 3 Claims

ABSTRACT OF THE DISCLOSURE

An arithmetic logic unit forms the product of a multiplicand and an N-digit multiplier representative of either a positive or a negative number by algebraically adding a sequence of partial products of the multiplicand and each of the first N ones of a succession of control factors determined by each successive multiplier digit plus any carries from a previous digit. To accomplish this, the unit is provided with facilities for suppressing the $(N+1)^{th}$ control factor normally associated with a carry from the $N^{th}$ digit order of a multiplier representative of a negative number in complement form. The resulting suppression of a finite constituent of the product of the multiplicand and a negative multiplier causes the negative final product to be also directly expressed as a quantity representative of a negative number in complement form.

This invention relates to arithmetic logic circuitry and, more particularly, to multiplying units suitable for use in computing devices and the like. Accordingly, it is a general object of the invention to provide new and improved apparatus of this character.

In many types of serial and serial-parallel computing machines, the addition and subtraction of negative numbers is most conveniently handled by representing the negative numbers by their complements with respect to the base of the system. Thus, in a system that operates with the base 10, a negative number −3679 would be represented by its tens complement +6321. Positive numbers in such a system would be employed in their true form without conversion.

Unfortunately, problems occur when it is desired to adapt arrangements of this type to the multiplication of a first number by a negative multiplier, especially in those cases where such a multiplication operation is to be performed between auxiliary addition and subtraction steps involving negative numbers also represented by their tens complements. In presently known methods for performing such multiplication, it is generally necessary to complete the following steps: (1) convert the complement of the negative multiplier back to its true form; (2) independently determine the sign of the product of the operation; and, if the sign of the product is negative, (3) convert the product (which is in its true form) back to complement form for use in further addition or subtraction operations. Thus, while positive numbers may be implemented directly by such machines without modification, such conversion and reconversion is necessary each time a multiplication operation involving negative multipliers is to be instrumented.

Another object of the invention, therefore, is to adapt such computing machines to perform multiplying operations with the use of either positive or negative multipliers without the necessity of form conversion at each interface of the multiplying unit.

These and related objects are attained with the arrangement of the present invention, in which the desired multiplication operation is accomplished by modifying a commonly known technique of multiplication suitable for positive numbers. In the usual method, the product of a first number and a multiplier each having N digit orders is formed through the algebraic addition of partial products in an ordered sequence. The partial products are respectively formed by multiplying the first number by each of a succession of control factors of successively higher order. The magnitude and sign of each factor is determined by the relative digit values in the corresponding order of the multiplier. In the presence of a predetermined sign of the factor corresponding to the $N^{th}$ order digit of the multiplier, a finite $(N+1)^{th}$ order factor (having a value of 1) is generated. Otherwise such a factor is zero. In the system contemplated by the invention, a positive multiplier is uniquely represented by an N-digit number whose highest digit value is in the range 1–4, while a negative multiplier is uniquely represented in complementary form by an N-digit number whose highest digit value is in the range 5–9. With this arrangement, it turns out that the $(N+1)^{th}$ control factor is finite only when the multiplier represents a negative number.

In a base 10 system of this type, the multiplier digits 0 through 4 are handled by adding the multiplicand a corresponding number of times, and the multiplier digits 5 through 9 are handled by subtracting the multiplicand a number of times equal to the tens complement of the digit. In the latter case, a carry of value 1 must be added to the next higher order multiplier digit. If, and only if, a carry occurs in the $N^{th}$ order digit of the multiplier after all previous carries are incorporated, the $(N+1)^{th}$ order of the multiplier will be given a value of 1 instead of 0. Each successive partial product is relatively shifted by one digit value with respect to the next preceding partial product. The shifted partial products are then added to get the final product.

In accordance with the invention, an arithmetic logic unit employing the partial product technique for forming the product of an N-digit multiplicand and an N-digit multiplier representative of either a positive or negative number having the above-described format is provided with circuitry which suppresses the formation of the partial product of the multiplicand and the $(N+1)^{th}$ control factor, if any; such partial product will have significance in any event only for negative multipliers as indicated above. This alteration will enable both positive and negative products to be directly read out of the unit in the required format without the necessity of form conversion.

The nature of the present invention and its various advantages and features are set forth more fully in the following detailed description of an illustrative embodiment thereof taken in connection with the appended drawing, in which:

FIG. 1 is a block diagram of a logic unit suitable for the multiplication of negative numbers in accordance with the invention;

FIGS. 3A and 3B illustrate typical arrangements of digits in the multiplicand and multiplier, respectively, whose product is to be derived by the arrangement of FIGS. 1 and 2;

FIG. 4 is a set of timing diagrams illustrating the formation of the partial products of the arrangements in FIGS. 3A and 3B and the manner in which the final partial product thereof is inhibited; and FIG. 5 is a diagrammatic representation of a circuit for inhibiting the final partial product of FIG. 4.

Figure 2:
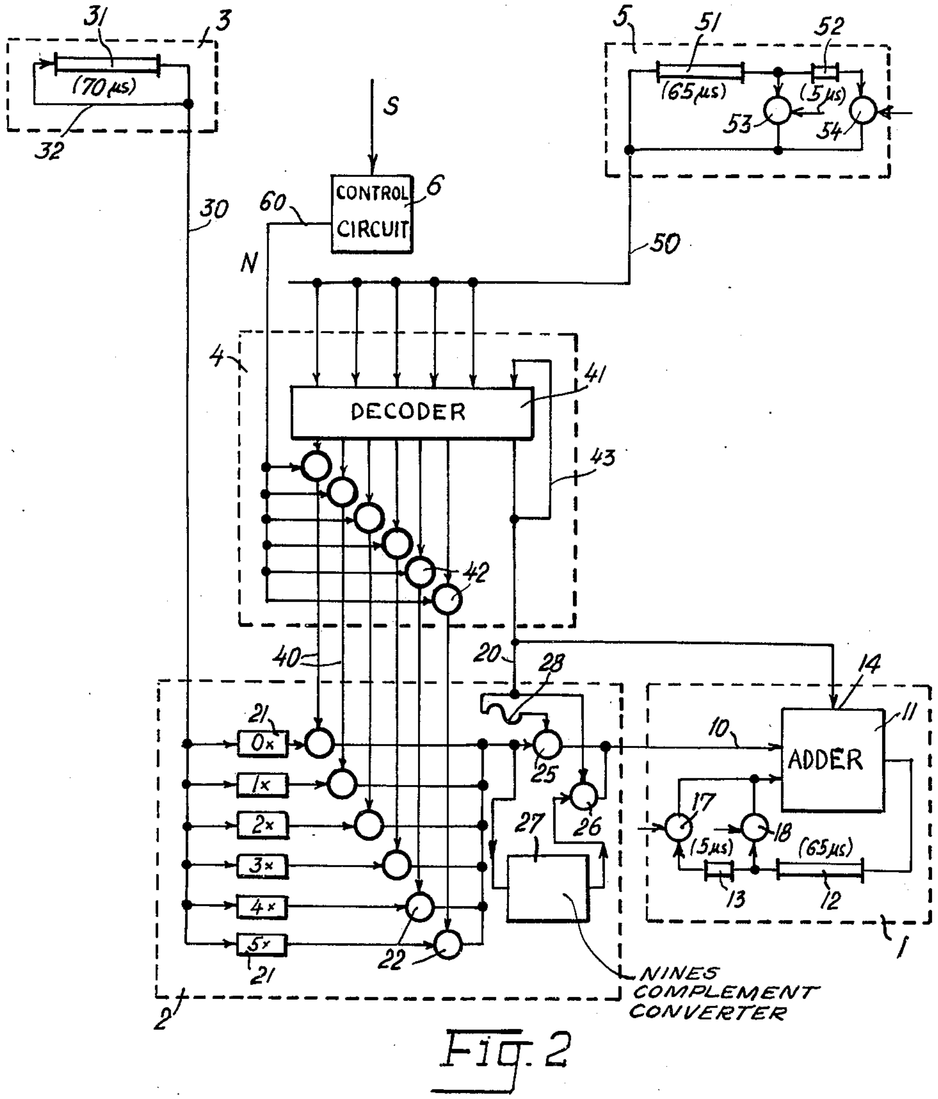
FIG. 2 is a schematic representation, partly in diagrammatic form, of the block diagram in FIG. 1.

Referring in more detail to the drawings, FIGS. 1 and 2 depict an illustrative serial type multiplying unit arranged to operate in accordance with the instant invention. For purposes of illustration, it is assumed that the unit of FIGS. 1 and 2 operates with a multiplicand in the form of a first word *p* arranged in a sequence of thirteen digits A, B, . . . M (FIG. 3A) of successively increasing order, each digit being encoded in five bits (not shown) which occur at intervals of one microsecond. Successive ones of the first words *p* are separated by a guard space R of one digit interval.

In like manner, the unit operates with a multiplier in the form of a second word *q* (FIG. 3B) which, like the first word *p*, is in the form of a sequence of thirteen digits *a*, *b*, . . . *m* of successively increasing order, each digit being also encoded in five bits occurring at intervals of 1 microsecond. The highest significant digit of the word *q* has a value in the range 1–4 when the word represents a positive multiplier, and in the range 5–9 when the word represents a negative multiplier in complementary form. For example, a word *q*=00 . . . 036 will be representative of a positive multiplier 36, while the word

*q*=00 . . . 064 will be representative of a negative multiplier —36 in complementary form. Successive second words are separated by a guard space *r* of one digit interval. With this arrangement, one complete cycle, or recurrent interval, of each of the words *p* and *q* occupies a space of 70 microseconds.

The first word *p* is circulated in a storage circuit 3. As shown best in FIG. 2, store 3 comprises a delay line 31 which has a delay of one interval (70 microseconds) of the word *p*. The store 3 recirculates the word *p* at intervals of the latter by means of a feedback connection 32. The recirculated outputs of the store 3 are coupled through an output lead 30 to the input of an auxiliary multiplier 2 for forming the partial products of the word *p* with selected ones of so-called K-factors 0, 1, 2, 3, 4, and 5. The K-factors are derived from the individual digits *a*, *b*, *c* . . . *m* representing the word *q* in the manner indicated below.

The lead 30 is coupled in parallel to individual multipliers 21, which are respectively associated with individual ones of the K-factors 0, 1, . . . 5. Each circuit 21 is adapted to operate by respectively outpulsing the word *p* a corresponding number of times (i.e., 1, 2, . . . 5) to a common output lead 10 through an associated one of a plurality of control gates 22. The desired one of the circuits 21 is selected by a transformation circuit 4 (described below), which in turn is controlled by the digits of the multiplier word *q*. The latter digits actuate corresponding ones of the normally inactivated gates 22, via the presence of a corresponding pulse on a selected one of a plurality of output leads 40 of the circuit 4. The selected partial product from the multipliers 21 is gated through the associated enabled gate 22 to the input of an adder 11 via the lead 10. As is well known, the sign of the partial product determines whether such partial product is processed in the adder 11 unchanged or in tens complement form, a pair of complementary gates 25 and 26 disposed in the lead 10. The gates 25 and 26 are individually controlled by the presence or absence of an output pulse on an auxiliary output lead 20 of the circuit 4, which also couples the digit carry, if any, back to the input of the decoder 41 through a lead 43. The absence of such a pulse during the occurrence of a K-factor signifies a positive sign of the factor while the presence of such a pulse signifies a negative sign of the factor. In the absence of an output pulse on the lead 20, the gate 25 is opened and the gate 26 is closed. In this case, the selected partial product is gated unchanged to the adder 11 through the gate 25. In the presence of a pulse on the line 20, the gate 25 is closed and the gate 26 is opened. As a result, the selected partial product is gated to the adder 11 through the gate 26 and after being converted to nines complement form by a suitable conversion network 27. The required further conversion from nines to tens complement form is provided in the adder 11 itself in a conventional manner by applying the control pulse on the line 20 to an additional input 14 of the adder as an artificial carry.

The adder 11 is provided with a principal feedback path consisting of a 65 microsecond delay line 12, a 5 microsecond delay line 13, and a gate 17 to form an accumulator 1. The latter algebraically adds the successive partial products gated thereto from the auxiliary multiplier 2. In a manner well known in the art, each successive partial product is entered into the accumulator 1 relatively shifted upward by one digit order with respect to the next preceding partial product. The required shift in the accumulator 1 may be accomplished at the conclusion of each cycle of the word *p* by means of a conventional shifting gate 18.

As indicated before, the transformation circuit 4 is controlled by the digits of the multiplier word *q*. For this purpose, the word *q* is initially entered into a second store 5, which consists of a closed loop comprising a 65 microsecond delay line 51, a 5 microsecond delay line 52, and a pair of gates 53 and 54 arranged in a manner generally similar to lines 12 and 13 and the gates 17 and 18, respectively, of the accumulator 1. Each successive digit of the word *q* is outpulsed from the store 5 in synchronism with a corresponding cycle of the word *p* representing the multiplicand. The resulting timing relation between the intervals of the successive digits *a*, *b*, *c* . . . *m* of the word *q* and the recurring intervals of the word *p* is shown in FIG. 4.

The successive digits of the word *q* are applied over an output lead 50 to the input of the decoder 41 of the transformation circuit 4.

The manner in which the transformation circuit 4 selects the proper K-factor 0, 1, 2, 3, 4, or 5 of the circuits 21 (and the proper sign of the resulting partial product) in accordance with the multiplier digit values appearing at the decoder input is determined, in a well-known manner, in accordance with the relationships in Table I.

TABLE I

| Effective digit Value | Corresponding K-Factor | Sign of corresponding Partial Product |
|---|---|---|
| 0 | 0 | PLUS |
| 1 | 1 | PLUS |
| 2 | 2 | PLUS |
| 3 | 3 | PLUS |
| 4 | 4 | PLUS |
| 5 | 5 | (*) |
| 6 | 4 | MINUS |
| 7 | 3 | MINUS |
| 8 | 2 | MINUS |
| 9 | 1 | MINUS |

*MINUS if both the actual digit value and the effective digit value are 5; PLUS if the effective digit value represents an actual digit value of 4 plus a carry from the previous order.

In the scheme contemplated above, the term "effective digit value" is used for convenience since an actual value in the range 5–9 of a multiplier digit of a given order results in a negative K-factor for that order as well as a carry which causes an increase of 1 in the value of the next higher order multiplier digit. For example, a multiplier word *q*=727 which is representative of a negative number as explained above is converted to an equivalent series of K-factors $1\bar{3}3\bar{3}$, where each bar indicates a negative quantity. This is determined as follows, starting from the lowest digit order.

| Effective digit value: | Corresponding K-factor |
|---|---|
| 7 | —3 |
| 2+ carry from previous order=3 | 3 |
| 7 | —3 |
| Carry from previous order=1 | 1 |

Thus it is seen that a three digit multiplier representative of a negative number will result in a four digit K-factor sequence, where the digit value 1 in the highest order of the K-factor sequence represents the carry from a value in the range 5–9 (i.e., 7) in the highest order multiplier digit. A three-digit multiplier representative of a positive number, on the other hand, will result in only a three digit K-factor sequence.

In accordance with the invention, facilities are provided in the arrangement of FIG. 1 for multiplying with either a positive or a negative multiplier word $q$ in such a manner that the final product is in a format which makes form conversion unnecessary at each interface of the multiplying unit. In this way, if a word $q$ representing a negative multiplier expressed in tens complement form is entered into the store 5, the resulting negative final product is read out directly from the unit of FIGS. 1 and 2 in the same complementary code. This is accomplished with the use of a control circuit 6, which comprises a bistable network 61 whose output is coupled in parallel via an output lead 60 to the enabling inputs of a plurality of gates 42. The gates 42 are individually interposed in the leads 40. With this arrangement, the gates 42 are enabled only when a control pulse N appears on an output lead 60 of the control circuit 6.

As shown best in FIG. 5, an activating input 65 of the bistable network 61 is triggered by an initiating pulse S, while a deactivating input 66 of the circuit 61 is coupled to the output of a coincidence gate 63. One input of the gate 63 is coupled to a sequence of synchronizing pulses P, which initiate each successive 70 microsecond interval of the words $p$ and $q$ (FIGS. 3A, 3B and 4A). The other input of the gate 66 is coupled to the output of a delay line 62, which is provided with a feedback loop through a gate 64. The delay line 62, whose input is coupled to the initiating pulse S, has a delay which is 1 microsecond greater than the interval of the words $p$ and $q$ (i.e., 71 microseconds) for recirculating the pulse S. As shown in FIG. 4, the initiating pulse S is timed to occur 13 microseconds before the pulse P that initiates the first cycle or interval (cycle I) of the multiplier word $q$. As shown, cycle I corresponds to the lowest order digit $a$.

With the arrangement of FIG. 5, time coincidence between a pulse P and the recirculated pulse S at the output of cycle XIII enables the gate 63 and thus disables the circuit 61. The resulting termination of the output pulse N also occurs at the end of cycle XIII, i.e., the interval corresponding to the last digit $m$ of the multiplier. As a result, even if a carry from cycle XIII appears in cycle XIV because of an effective value of the highest order digit $m$ in the range 5–9 (as is the case with a negative multiplier), such carry (which would ordinarily cause a pulse on a selected lead 40 to enable a gate 22) is decoupled from the auxiliary multiplier 2 because of the now inoperative condition of the associated control gate 42. Accordingly, a partial product from the corresponding circuit 21, i.e., that representing the carry, if any, in cycle XIV, is not available at the input of the adder 11. Thus, the product of the words $p$ and $q$ in such a case is the algebraic sum of the relatively shifted partial products of the word $p$ and the first 13 K-factors individually corresponding to the values $a, b, c \ldots m$ of the 13 digit orders in the word $q$.

As a practical illustration of the application of the inventive arrangement of FIG. 1, the operation of the unit of FIGS. 1 and 2 will now be compared for (a) a positive multiplier $q$ and (b) a corresponding negative multiplier $q$ expressed in tens complement form.

Consider first the formation of the product of two positive 13 digit numbers $p$=0000000000083 and $q$=0000000000454 with the arrangement of FIG. 1. Thus, the sequence of the K-factor equivalents of the multiplier word $q$, starting with the lowest order digit, is formed as follows.

| Effective digit value: | Corresponding K-factor |
|---|---|
| 4 | 4 |
| 5 | −5 |
| 4 plus carry from previous digit=5 | −5 |

Thus, disregarding the front zeros, the word $q$=454 is expressed by the sequence of K factors $\bar{5}\bar{5}4$. This sequence dictates that during the first multiplicand cycle applied to the auxiliary multiplier 2 from the store 3, the multiplicand is added four times in the accumulator 1 to form the first partial product; the count in the accumulator is then shifted one digit order. During the next mutliplicand cycle, the multiplicand is subtracted five times from the shifted count in the accumulator; the accumulator count is then shifted again. During the following multiplicand cycle, the multiplicand is added five times to the shifted count in the accumulator to obtain the final product. This sequence of operations may be represented as follows, in which for simplicity each relative shift between a partial product and the accumulator count is shown as a shift of the partial product, rather than of the accumulator count:

| |
|---:|
| 0000000000000 |
| +83 |
| 0000000000083 |
| +83 |
| 0000000000166 |
| +83 |
| 0000000000249 |
| +83 |
| 0000000000332 |
| −83 |
| 9999999999502 |
| −83 |
| 9999999998672 |
| −83 |
| 9999999997842 |
| −83 |
| 9999999997012 |
| −83 |
| 9999999996182 |
| +83 |
| 0000000004482 |
| +83 |
| 0000000012782 |
| +83 |
| 0000000021082 |
| +83 |
| 0000000029382 |
| +83 |
| 0000000037682 |

The product of the given numbers $p$ and $q$ is therefore the positive number 37682, as expected.

Now, however, consider the product of $p$=0000000000083 and $q'$=0000000000546, the latter being representative of the tens complement of a negative multiplier $q$=−000 . . . 454. The resulting K factor sequence corresponding to $q'$ is given (starting with the lowest order) as follows.

| Effective digit value: | Corresponding K-factor |
|---|---|
| 6 | −4 |
| 4+ carry from previous digit =5 | 5 |
| 5 | −5 |
| Carry from previous digit | 1 |

Thus the word $q'$=546 is expressed by sequence of K factors $1\bar{5}5\bar{4}$. This means that by analogy to the sequence of operations outlined above in connection with a positive multiplier, four operations would normally take place: the multiplicand is subtracted four times in the accumulator to form the first partial product; the count in the accumulator is then shifted. The multiplicand is then added five times to the shifted accumulator count, and the result is shifted again. The multiplicand is then subtracted five times from the shifted accumulator count; and the result is shifted again. Finally, the multiplicand itself is added to the shifted accumulator count to obtain the final product. Because of the operation of the elements 25–27, however, the last shift and addition (i.e., that caused by the carry in the $(N+1)^{th}$ K-factor) is inhibited, and the product will be the appropriate sum of the first three operations only. The resulting operations are as follows:

```
0000000000000
          -83
-------------
9999999999917
          -83
-------------
9999999999834
          -83
-------------
9999999999751
          -83
-------------
9999999999668
```

The front row of nines, of course, indicates a negative product, and the resulting magnitude 62318 is a direct tens complement representation of the negative product −37682 of the numbers $p$=000 . . . 0083, and $q$=000 . . . 00454. This form is directly compatible with further addition and subtraction operations in this format, or with further similar multiplication operations.

It is seen, therefore, that with the arrangement of the invention it is possible to directly multiply negative quantities in the same manner as positive quantities, i.e., without the necessity of (a) changing the input representation from complementary form to true form; (b) independently determining the sign of the product; and (c) finally changing the output representation from true form back to complementary form.

What is claimed is:

1. Apparatus for forming the product of a multiplicand and a multiplier through the algebraic addition of partial products in an ordered sequence, the multiplier having a highest digit value in the range 1–4 when representing a positive number and a corresponding digit value in the range 5–9 when representing a negative number in complement form, which comprises:

an accumulator for relatively shifting partial products applied to an input therof and for forming the sum of the relatively shifted partial products;

auxiliary multiplying means having first and second inputs for receiving numbers to be multiplied and an output coupled to the input of said accumulator;

means for cyclically applying the entire multiplicand to the first input of said auxiliary multiplying means at a first rate;

means operative in synchronism with said cyclically applying means for outpulsing the successive digits of the multiplier from lowest to highest order at the first rate;

means for individually converting the successively outpulsed digits of the multiplier into control factors whose magnitude and sign is determined by the value of the then-outpulsed multiplier digit and a carry, if any, from the preceding mulitplier digit, whereby the highest digit of a negative multiplier generates a carry which serves as the control factor during the next succeeding multiplicand cycle while the highest digit of positive multiplier generates no carry;

means for applying successive ones of the control factors to the second input of said auxiliary multiplying means at the first rate so that said auxiliary multiplying means generates partial products of the multiplicand and successive ones of the control factors; and means for inhibiting the application of the control factor, if any, from said control factor applying means to the second input of said auxiliary multiplying means during the multiplicand cycle next succeeding the outpulsing of the highest order digit of the multiplier.

2. Apparatus as defined in claim 1, in which said inhibiting means comprises, in combination, gating means interposed between said converting means and the second input of said auxiliary multiplying means, said gating means having a control input for enabling said gating means when excited;

means operative during the successive multiplicand cycles corresponding to the successive outpulsed digits of the multiplier for exciting the control input of said gating means; and means operative during the next succeeding multiplicand cycle for removing the excitation from the control input of said gating means to disable said gating means.

3. Apparatus as defined in claim 1, in which said exciting means comprises, in combination, a bistable pulse forming circuit; means coupled to the output of said pulse forming circuit for exciting the control input of said gating means when said circuit is in a first one of its stable states; means for switching said circuit in to its first stable state at the start of the multplicand cycle corresponding to the outpulsing of the lowest order multiplier digit; and means triggered at the conclusion of the multiplicand cycle corresponding to the outpulsing of the highest order multiplier digit for switching said circuit out of its first stable state.

References Cited

UNITED STATES PATENTS

| | | | |
|---|---|---|---|
| 3,278,731 | 10/1966 | Yen | 235—160 |
| 3,116,411 | 12/1963 | Keir | 235—164 |

OTHER REFERENCES

R. K. Richards: Arithmetic Operations in Digital Computers, 1955, pp. 250–252.

R. B. Hennis and G. D. Mentzer: Decimal Complement Multiplying, IBM Technical Disclosure Bulletin, October 1958.

MALCOLM A. MORRISON, Primary Examiner

DAVID H. MALZAHN, Assistant Examiner

U.S. Cl. X.R.

235—159